A. J. JENSEN.
MEASURE.
APPLICATION FILED OCT. 4, 1913.
1,105,439.
Patented July 28, 1914.
2 SHEETS—SHEET 1.
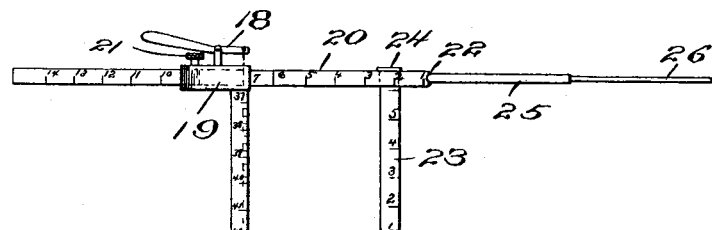
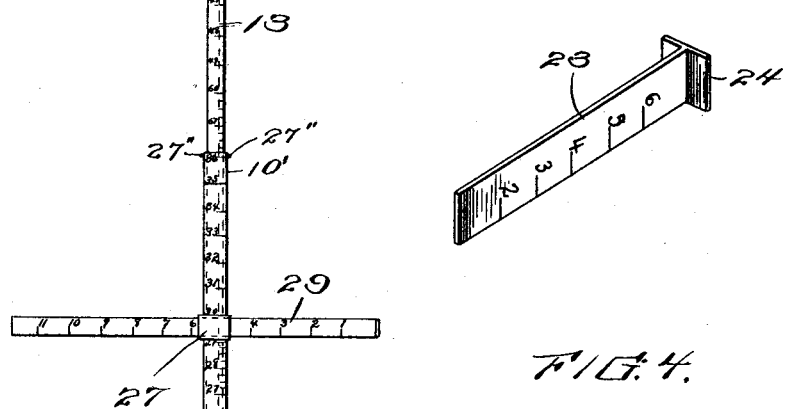
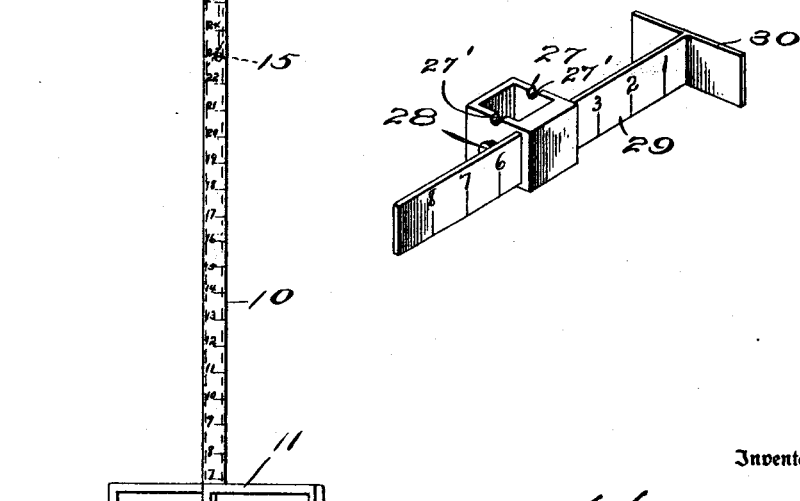
Inventor
Albert J. Jensen,
By Mason Fenwick Lawrence
Attorneys
Witnesses A. J. JENSEN
MEASURE.
APPLICATION FILED OCT. 4, 1913.
1,105,439.
Patented July 28, 1914.
2 SHEETS—SHEET 2.
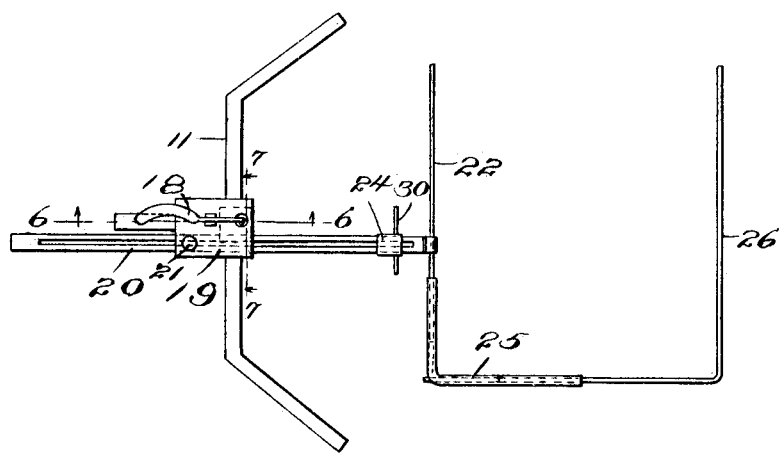
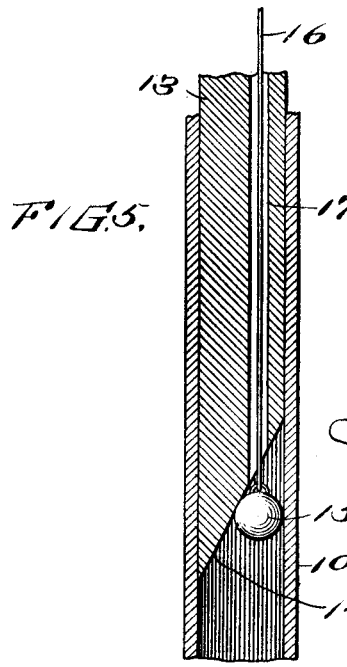
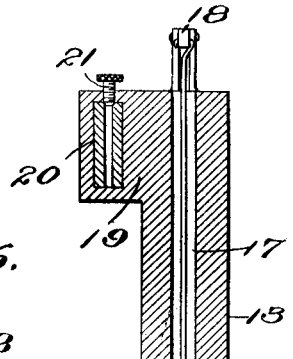
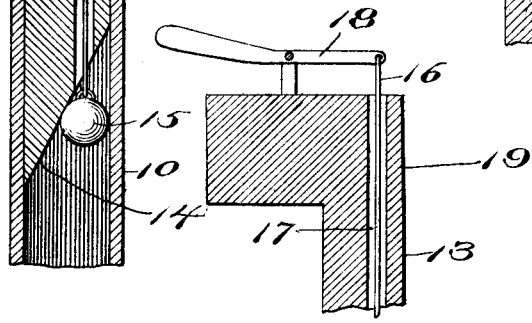

UNITED STATES PATENT OFFICE.

ALBERT J. JENSEN, OF VANCOUVER, BRITISH COLUMBIA, CANADA.

MEASURE.

1,105,439.  Specification of Letters Patent.  Patented July 28, 1914.

Application filed October 4, 1913. Serial No. 793,455.

*To all whom it may concern:*

Be it known that I, ALBERT J. JENSEN, a subject of the King of Denmark, residing at Vancouver, in the Province of British Columbia and Dominion of Canada, have invented certain new and useful Improvements in Measures; and I do hereby declare the following to be a full, clear, and exact description of the invention, such as will enable others skilled in the art to which it appertains to make and use the same.

This invention relates to measuring instruments and has for an object to provide an instrument especially adapted for measuring certain dimensions of persons being fitted with clothing and for other like purposes.

A further object of the invention is to provide a device which simultaneously will determine the height of a person being measured to the collar line, the distance from the collar line to the shoulder tip, the drop of the shoulder, the size of the collar, position of the collar relative to the shoulder and to a vertical and the hollow of the back or other points to be measured upon the body.

With these and other objects in view the invention comprises certain novel constructions, combinations and arrangements of parts as will be hereinafter more fully described and claimed.

In the drawings: Figure 1 is a view of the improved measuring device in front elevation. Fig. 2 is a top plan view of the measuring device. Fig. 3 is a view of one of the measuring arms removed. Fig. 4 is a perspective view of the other of the measuring arms and retaining box removed. Fig. 5 is a sectional view showing the lock for retaining the telescoping sections in adjusted position. Fig. 6 is a sectional view showing the handle for operating the lock and taken on line 6—6 of Fig. 2. Fig. 7 is a sectional view through the lock operating mechanism taken on line 7—7 of Fig. 2.

Like characters of reference designate corresponding parts throughout the several views.

The improved measuring device which forms the subject matter of this application comprises a standard 10 mounted upon a base 11 which latter is supported upon feet 12 in such relation that the toes of the person being measured may be inserted between the feet 12 and under the base 11. The standard 10 is hollow as shown particularly at Fig. 5 with a rod 13 telescoping into said standard 10. To lock the rod 13 vertically in adjusted position relative to the standard 10 the said rod 13 is provided at its lower end with a beveled extremity as shown at 14 and a ball 15 is engaged under such beveled end controlled by a wire or other cable 16 which extends upwardly through a passage 17 in the rod 13 to a hand lever 18 pivoted upon the head 19 carried by the rod 13. It is apparent that by loosening the ball 15 from its angular engagement as shown at Fig. 5 the rod 13 may be moved upwardly and downwardly telescopically within the standard 10 and retained in such position by depressing the outer end of the hand lever 18. The standard 10 is provided with a scale preferably in inches, as indicated at Fig. 1, starting with the numeral indicating the height of the top of the base 11, here shown as 7, it being understood that the top of the base 11 is practically seven inches above the floor line. The numerals along the standard 10 are continued to any number required for its length, here shown as extending to the numeral 36. The top of the standard 10 terminating as shown in Fig. 1 at 35 is provided with a sleeve 10′ which is a continuation of the standard 10 but independent thereof, the function of which will be hereinafter more fully explained. The rod 13 telescoping within the standard 10 is also provided with numerals beginning at its upper end with the numeral next succeeding the top numeral on the standard 10, here shown as 37 and increasing downwardly. It is apparent that given the numbers as shown in Fig. 1 if the head 19 is lowered to the top of the standard 10 it would be thirty-six inches above the floor. If raised one inch it would be thirty-seven inches, that being the next number and consequently the series of numbers on the rod 13 increases downwardly.

The head 19 is mortised as shown particularly at Fig. 7 with a slotted arm 20 extending through such mortise and controlled by any approved locking means as the thumb screw 21. The slotted arm 20 carries a T-head 22 so that the standard and rod extended to the necessary degree may be set alongside the arm of the user and the arm 20 extended until the T-head 22 engages against the sides of the neck of the person being measured. The measurement read on the scale upon the arm 20 will be the measurement from the neck to the tip of the shoulder while the measurement read upon the scale on the rod 13 will be the height to the junction of the neck and shoulder. A pendent measuring arm 23 is also provided which may be dropped through the slot of the slotted arm 20 until its T-head 24 engages said arm 20 or until the lower end of the arm 23 engages the shoulder in which latter case the measurement read on the scale upon said arm will indicate the drop of the shoulder. An angular socket member 25 is also provided which will slip upon the end of the T-head 22, with a second angular member 26 slidable within the socket member 25 so that the exact position of the back or front of the neck can be determined as well as the size of the neck by sliding said angular member within said angular socket and the angular socket upon the T-head 22.

Slidable upon the upright 10 is a sleeve 27 controlled in any approved manner as by the set screw 28 and provided with a mortise through which a measuring arm 29 extends, said arm being provided at one extremity with a T-head 30. The member 27 is provided with notches 27' which are positioned and proportioned to engage lugs 27'' carried by the sleeve 10' so that as the slide 27 is moved upwardly on or off from the end of the standard 10 it engages upon the sleeve 10' which by reason of the engagement of the lugs 27'' with the notches 27' moves upwardly with the slide 27. The sleeve 10' is provided with any sort of an opening so that the set screw 28 may pass through such opening into engagement with the rod 13. The measuring instrument as it stands adjacent or in any fixed relation to the person being measured will determine the depression at the waist line or at any other part of the body by adjusting the arm 29 relative to the standard 10. By adjusting the instrument as above described and recording the various measurements read upon the various scales it will be apparent that a contour of the body will be readily and easily arrived at.

While a number of different uses have been mentioned incidentally in the description of the device it is to be understood that the structure is capable of a very large number of uses not enumerated herein and as circumstances may make desirable when the device is put into operation. It is further believed that the operation of the device has been fully and clearly explained in the description of its construction.

I claim:

1. In a measuring instrument, the combination with a tubular standard mounted on a base, a rod telescoping within said standard, a measuring arm carried by said rod, and means for holding the latter in adjusted position; of pins in the sides of the standard at its upper end, a sleeve slidably mounted on the standard and having notches adapted to engage said pins, means for holding the sleeve in adjusted position, and a measuring arm carried by said sleeve.

2. In a measuring instrument, the combination with an adjustable upright having a transversely mortised head at its upper end; of a slotted arm passing through said mortise and having a T-head at one end, means for holding the arm in adjusted position, and a pendent measuring arm having a head at its upper end, its body passing through the slot in said slotted arm, for the purpose set forth.

3. In a measuring instrument, the combination with an upright having a head at its upper end, and an arm adjustable horizontally through said head and itself having a T-head at one end; of an angular socket member having one end mounted on one extremity of said T, and an angular member removably inserted into the other end of the socket member, as and for the purpose set forth.

In testimony whereof I affix my signature in presence of two witnesses.

ALBERT J. JENSEN.

Witnesses:
G. WARD KEMP,
W. B. NEIGHBORS.

---

Copies of this patent may be obtained for five cents each, by addressing the "Commissioner of Patents, Washington, D. C."